April 27, 1965 E. H. LAMBOURN 3,181,136
ELECTRIC PULSE CODE TRANSLATORS
Filed Oct. 27, 1960
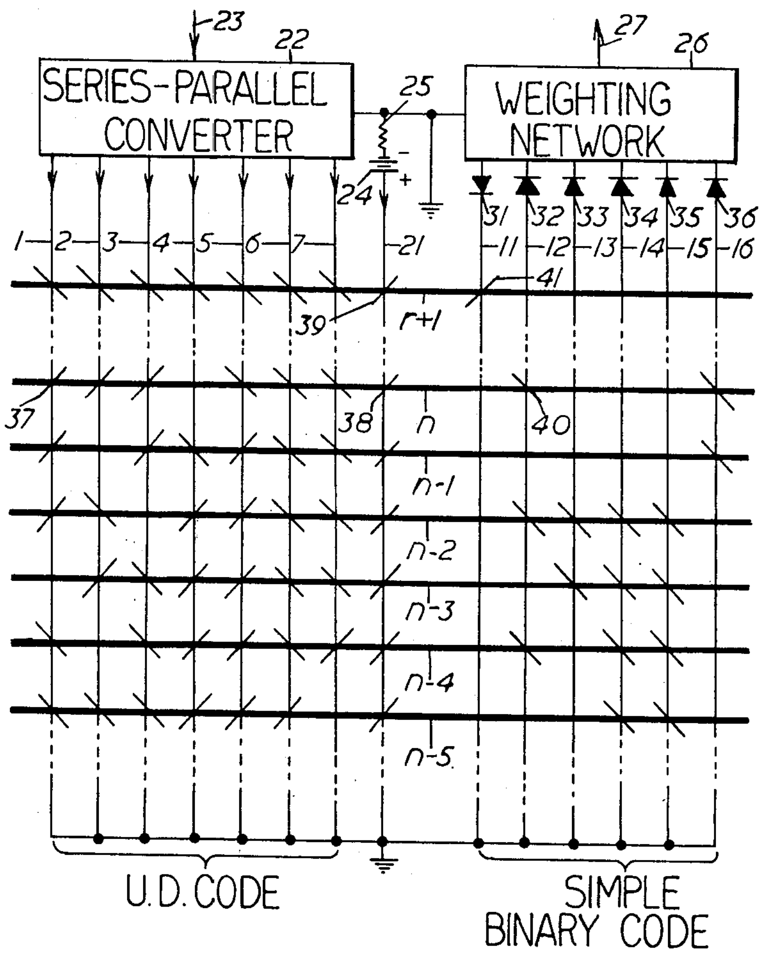
Inventor
E.H.LAMBOURN
By C.H.Suydam
AGENT United States Patent Office 3,181,136

Patented Apr. 27, 1965

3,181,136

ELECTRIC PULSE CODE TRANSLATORS

Edward Harry Lambourn, London, England, assignor to International Standard Electric Corporation, New York, N.Y.

Filed Oct. 27, 1960, Ser. No. 65,305
Claims priority, application Great Britain, Dec. 7, 1959, 41,589/59
7 Claims. (Cl. 340—347)

The present invention relates to electric pulse code translators.

In electric pulse code modulation systems of communication, samples of signal waves are commonly represented for transmission by groups of code pulses according to some form of the binary code. The simplest form of the binary code, in which the magnitude of a sample is represented by the series $a+2b+2^2c+2^3d+\ldots$ (where each of the coefficients $a$, $b$, $c$, etc. is either 0 or 1), has often been used because it can very easily be decoded. This form of the code will be referred to as the "simple binary code." This code, however, has a number of well-known disadvantages, and it has more recently been the practice to employ other forms of the binary code, which, however, are usually inconvenient for direct decoding. It has therefore been proposed to use some form of code translator at the receiving end of the system by which the received pulse code combinations are converted before decoding into combinations according to the simple binary code.

In recent years, saturable magnetic cores of ferrite or other like material with a so-called "square" hysteresis loop, and capable of assuming two conditions of opposite saturation, have come into use in pulse code modulation systems, and it has proved advantageous to provide one magnetic core per amplitude level represented by the code. A code translator on this basis has already been proposed. However, other two-condition coding devices or circuits besides magnetic cores could be used in like manner, and so it may be said that it is usual to provide one coding element of some appropriate type for each amplitude level represented by the code.

The object of the present invention is to reduce the number of coding elements which must be provided in code translating arrangements of this kind. In the case where the coding elements are magnetic cores, a reduction in the number of cores is desirable not only because it simplifies and cheapens the assembly of the translator, but also because it reduces the difficulties associated with "sneak pulses," that is, pulses due to small changes in the flux of cores which do not reverse in response to an applied pulse combination.

The invention takes advantage of the properties of a particular form of the binary code which has been found to have an advantage in that imperfections in the coder do not result in large coding errors, which is liable to happen if the simple binarly code is used. This particular form of the binary code has been called a "unit-distance" code, and is defined as a binary code in which the code combinations corresponding to every two successive signal amplitude levels differ only in one digit. In the case of a binary code of M digits, the maximum number of different combinations available is $2^M$, and certain arrangements of these combinations have the unit distance property.

However, for other reasons, it may not be convenient to employ all the possible combinations of a binary code of M digits, and certain particular selections are therefore made. One particular selection constitutes what has been called the "unit-disparity" code, and is defined as one having an odd number $2m-1$ of digits, and in which every code combination has either $m$ or $m-1$ pulses.

If a digit in which a pulse is present be called a marking digit and one in which no pulse is present be called a spacing digit, then the "disparity" is the difference between the number of marking digits and the number of spacing digits in a given code combination. In the case of the unit-disparity code, the disparity is always equal to 1, and will be considered as positive when the number of marking digits exceeds the number of spacing digits, and negative otherwise.

The maximum number of different pulse code combinations which the unit-disparity code will provide is $N=2.(2m-1)!/m!(m-1)!$, and half the combinations have positive disparity and half have negative disparity. It is, of course, not essential to utilise all the combinations available in any particular case.

When the unit-disparity code is used to represent a series of signal amplitude levels, there are a large number of different ways in which the code combinations could be allotted to the respective signal levels. In particular, there are a number of arrangements which also have the unit-distance property. Any one of these arrangements constitutes what may be called a "unit-disparity, unit-distance binary code." Such a code has certain transmission advantages and may be shortly defined as a binary code of an odd number $2m-1$ of digits representing a monotonic series of magnitudes, in which every code combination has either $m$ or $m-1$ digit pulses, and in which code combinations representing adjacent pairs of magnitudes differ only in one digit. Unit-disparity unit-distance binary codes are described, for example, in the specification of British application No. 11905/58, now British Patent No. 849,891 issued January 18, 1961.

It should, however, be pointed out that binary codes with higher than unit disparity can also have the unit-distance property. For example, a binary code of seven digits in which all the code combinations have either two or three digit pulses can be arranged as a unit-distance code, and will have a negative disparity of either 1 or 3. Again, an eight-digit binary code having either four or five digit pulses will have a disparity of either zero or +2. In general, if the code has the unit-distance property, then the disparity will have at least two values differing by two units.

The invention is applicable in its broadest aspect to binary codes of the unit-distance type, but in the preferred embodiment which will be described to illustrate the invention, the code employed is a unit-disparity, unit-distance binary code.

The invention accordingly provides an electric pulse code translator for converting incoming pulse code combinations representing a series of signal amplitude levels according to a unit-distance binary code as herein defined into corresponding outgoing pulse code combinations according to a different code, comprising a plurality of coding elements corresponding respectively to different pairs or incoming pulse code combinations, the combinations of each pair having different disparities, and each coding element being responsive to either of the corresponding incoming pulse code combinations, and to no others, an additional coding element responsive to all incoming pulse code combinations having disparity of one predetermined value, means for applying an incoming pulse code combination simultaneously to all the coding elements, and means controlled by the particular coding element or elements which responds or respond to the incoming pulse code combination for generating the corresponding outgoing pulse code combination.

The above-mentioned preferred embodiment employs magnetic cores as coding elements, and will be described with reference to a circuit diagram shown on the accompanying drawing.

The operation of the embodiment depends on the unit-distance property of the code.

In Table I below, the code combinations corresponding to 12 successive levels numbered from $2n-11$ to $2n$ (where $n$ is equal to or less than $N/2$) are given, according to one form of the unit-disparity, unit-distance code of 7 digits, which is denoted in the table as the "U.D. code." The table also shows on the right-hand side the corresponding code combinations according to the simple binary code of six digits:

TABLE I

| Core No. | Level No. | U.D. code digit No. | | | | | | | Binary code digit No. | | | | | |
|---|---|---|---|---|---|---|---|---|---|---|---|---|---|---|
| | | 1 | 2 | 3 | 4 | 5 | 6 | 7 | 1 | 2 | 3 | 4 | 5 | 6 |
| $n$ | $2n$ | 0 | 0 | 0 | $\underline{0}$ | 1 | 1 | 1 | 0 | 1 | 0 | 0 | 0 | 1 |
| | $2n-1$ | 0 | 0 | 0 | 1 | 1 | 1 | 1 | 1 | 1 | 0 | 0 | 0 | 1 |
| $n-1$ | $2n-2$ | 0 | $\underline{0}$ | 0 | 1 | 0 | 1 | 1 | 0 | 0 | 0 | 0 | 0 | 1 |
| | $2n-3$ | 0 | 1 | 0 | 1 | 0 | 1 | 1 | 1 | 0 | 0 | 0 | 0 | 1 |
| $n-2$ | 2n−4 | 0 | 1 | $\underline{0}$ | 0 | 0 | 1 | 1 | 0 | 1 | 1 | 1 | 1 | 0 |
| | 2n−5 | 0 | 1 | 1 | 0 | 0 | 1 | 1 | 1 | 1 | 1 | 1 | 1 | 0 |
| $n-3$ | $2n-6$ | $\underline{0}$ | 0 | 1 | 0 | 0 | 1 | 1 | 0 | 0 | 1 | 1 | 1 | 0 |
| | $2n-7$ | 1 | 0 | 1 | 0 | 0 | 1 | 1 | 1 | 0 | 1 | 1 | 1 | 0 |
| $n-4$ | $2n-8$ | 1 | $\underline{0}$ | 1 | 0 | 0 | 1 | 0 | 0 | 1 | 0 | 1 | 1 | 0 |
| | $2n-9$ | 1 | 1 | 1 | 0 | 0 | 1 | 0 | 1 | 1 | 0 | 1 | 1 | 0 |
| $n-5$ | $2n-10$ | 1 | 1 | 1 | 0 | 0 | 0 | $\underline{0}$ | 0 | 0 | 0 | 1 | 1 | 0 |
| | $2n-11$ | 1 | 1 | 1 | 0 | 0 | 0 | 1 | 1 | 0 | 0 | 1 | 1 | 0 |

In this table "1" in any digit column indicates the presence of the corresponding digit pulse, and "0" indicates the absence of the digit pulse. It will be understood that only part of the code is shown. The U.D. code with 7 digits provides for a total of 70 amplitude levels, so it will be understood that the table should be extended below and/or above on the same plan in order to depict the whole code. The portion shown, however, will be sufficient to make the invention clear.

It will be seen from the table that in the case of the U.D. code, odd numbered levels all have 4 digit pulses and even numbered levels all have 3 digit pulses. The levels are treated in pairs. Considering for example, levels $2n-4$ and $2n-5$, it will be seen that the corresponding code combinations differ in that digit 3 has a pulse for level $2n-5$ but no pulse for level $2n-4$.

According to the invention, as will be explained later with reference to the figure of the drawing, a single saturable magnetic core for levels $2n-4$ and $2n-5$ is used which has windings by which it is made responsive to the pulses of digits 1, 6 and 7, but there is no winding corresponding to digit 3. This core, No. $n-2$, will accordingly respond to the combinations of both the levels $2n-4$ and $2n-5$.

The "0" in the digit 3 column corresponding to level $2n-4$ has been underlined to indicate that core No. $n-2$ has no digit 3 winding. It has, however, "straight" windings corresponding to digits 2, 6 and 7, and "reverse" windings corresponding to digits 1, 4 and 5, as will be more fully explained below. It will be noted that digit 3 is the digit which changes when the level changes from $2n-4$ to $2n-5$.

Core No. $n-2$ is also provided with output digit winding corresponding to simple binary code digits 2 to 5, as indicated in the table for level $2n-4$.

Each of the other pairs of levels is provided with a magnetic core arranged on the same principle as core No. $n-2$, with output windings corresponding to one or more of the binary digits 2 to 6, as indicated in Table I. The cores are numbered from $n$ to $n-5$.

It will be obvious that none of the cores can distinguish between the two levels to which it corresponds.

The necessary distinction is obtained by means of one extra distinguishing core, not indicated in Table I, which has 7 input windings corresponding to the 7 digits of the U.D. code, to which the digit pulses are applied, and is biased so that it will respond if 4 pulses are present, but not if only 3 pulses are present. In other words, it responds if the disparity is positive but not if it is negative. This extra core has an output winding corresponding to digit 1 of the simple binary code, and it will be seen that it will produce a binary digit 1 pulse for all the odd-numbered levels, but not for any of the even-numbered levels. Thus it will be clear that the code translation is carried out for the whole 70-level U.D. code by using 36 cores instead of 70. In general, in the case where a U.D. code of $2m-1$ digits is used to provide for $2r$ amplitude levels, the number of cores required according to the invention is $r+1$ instead of $2r$, in which $r$ is equal to or less than $N/2$.

Referring now to the figure of the drawing, six similar saturable magnetic translator cores numbered from $n$ to $n-5$ corresponding to those listed in Table I are shown. The extra distinguishing core, which may be similar to the others, is also shown and is designated $r+1$. In order to simplify the circuits, a magnetic core is shown diagrammatically as a thick horizontal line. A winding on a core will be shown as a short line inclined upwards to the left to indicate a winding wound "straight," and inclined upwards to the right to indicate one wound "reverse." A vertical line through the intersection of a winding line with the core line indicates a conductor with which the winding is in series. A current flowing downwards through a "straight" winding will be assumed to produce a magnetic field from left to right in the core. Although the cores are shown diagrammatically as straight rods, they will preferably be of toroidal form, and will be of ferrite or of some other suitable saturable ferromagnetic material with a so-called "square" hysteresis loop.

On the left-hand side of the figure are seven vertical input digit conductors numbered from 1 to 7, and corresponding respectively to the seven digits of the U.D. code. On the right-hand side are six vertical output conductors numbered from 11 to 16, and corresponding respectively to the six digits of the simple binary code. An additional vertical bias conductor 21 is shown between the two groups of digit conductors already mentioned. All the conductors are connected to ground at the lower ends, and are shown dotted above and below the group of translator cores $n$ to $n-5$ to indicate that there will usually be other translator cores (not shown) above and/or below the translator cores which are shown.

The digit pulses of the code combinations according to the U.D. code generally arrive in sequence, and in that case it is necessary to provide a series-to-parallel converter 22 of conventional type. The incoming pulses arrive over conductor 23, and the converter 22 is connected to the seven input digit conductors 1 to 7 as shown. The converter re-times the digit pulses of each code combination so that they all arrive simultaneously on the corresponding input digit conductors 1 to 7. As already explained, there will be either 3 or 4 digit pulses in each case distributed among the input conductors 1 to 7 according to the code. It will be assumed that the digit pulses are supplied to the input conductors with positive polarity, and all with the same amplitude.

The upper end of the bias conductor 21 is connected to the positive terminal of a suitable direct current bias source 24 the negative terminal of which is connected to ground through a variable resistor 25, which may be used for adjusting the bias current.

The upper ends of the output digit conductors 11 to 16 are connected through rectifiers 31 to 36 to a conventional weighting network or circuit 26 which combines the output binary digit pulses of each code combination with appropriate magnitudes to produce an output pulse having an amplitude proportional to the corresponding signal sample in known manner. The output sample pulse is delivered to the output conductor 27.

Each of the translator cores $n$ to $n-5$ is provided with six input digit windings, connected respectively in series with six of the seven conductors 1 to 7. One of these input windings is designated 37 on core No. $n$. Of these input windings, three are wound straight and three reverse. Referring to Table I, it will be seen that in the case of core No. $n-2$, for example corresponding to level No. $2n-4$, there are digit pulses for digits 2, 6 and 7. Accordingly, the digit windings for digits 2, 6 and 7 on core No. $n-2$ are wound straight. It will be noted also from Table I that the "0" corresponding to digit 3 is underlined, this digit being the one which changes from "0" to "1" when the level changes from $2n-4$ to $2n-5$. Accordingly core No. $n-2$ has no input digit winding corresponding to digit 3. The input digit windings corresponding to the remaining digits 1, 4 and 5 are wound reverse on core No. $n-2$.

The other translator cores are provided with input digit windings on the same plan according to the pattern of Table I. All these digit windings have the same number of turns.

The distinguishing core No. $r+1$ is provided with 7 input digit windings, one for each of the seven digits of the U.D. code, and all are wound straight. These input windings have the same number of turns as the others. Each of the cores is provided with a bias winding 38 wound reverse, and connected in series with the bias conductor 21. The bias current flows downwards through conductor 21 and biases all the cores negatively with a field from right to left. The necessary magnitude of the bias current will be explained later.

The U.D. code combination corresponding to level No. $2n-4$ is 0100011, as shown by Table I. When this combination arrives, the three digit pulses are supplied respectively to the three straight windings on core No. $n-2$ and no pulse is supplied to any reverse winding. An operating magnetic field corresponding to three positive units, in a direction left to right, is thus produced. It will be noted that in the case of every other one of the translator cores, a digit pulse will be supplied to not more than two of the input windings and one or more will be applied to reverse windings, or there may be no winding corresponding to one of the digit pulses. Thus for every core other than core No. $n-2$ the operating magnetic field cannot exceed two positive units; and may be negative. The number of turns of the bias winding, and the bias current from the source 24, are adjusted so that an operating field of three positive units is sufficient to reverse the condition of saturation of a core, but one of two positive units is insufficient. In that case the only core which will respond to the combination 0100011 is core No. $n-2$.

It will be noted that the code combination for level $2n-5$ is 0110011, and since there is no input winding on core No. $n-2$ corresponding to digit 3, the last-mentioned combination will also produce a field from left to right in core No. $n-2$ of three positive units, and will reverse the condition of the core. Since, however, the distinguishing core No. $r+1$ has seven straight windings, the combination for level $2n-5$, namely 0110011 will produce an operating field from left to right of four positive units, while the combination for level $2n-4$, namely 0100011 will produce a field of three positive units only. The number of turns of the bias winding 39 on core No. $r+1$ is therefore chosen to produce a bias field which permits the core to be reversed by a combination having four digit pulses, but not by a combination having only three digit pulses. Thus if the received combination corresponds to level No. $2n-4$, only core $n-2$ responds, while if the level is No. $2n-5$ then both the cores Nos. $n-2$ and $r+1$ respond.

It will be evident that the distinguishing core No. $r+1$ will respond to the combinations corresponding to all the odd numbered levels, but not to those corresponding to the even numbered levels.

Each of the translation cores $n$ to $n-5$ is provided with one or more output windings 40 wound straight, all having the same number of turns, and connected in series with certain of the output conductors 32 and 36, according to the code pattern for digits 2 to 6 shown in Table I. Thus, whenever one of the cores Nos. $n$ to $n-5$ is reversed by an incoming combination according to the U.D. code, corresponding positive digit pulses for one or more of digits 2 to 6 according to the simple binary code are produced. In the case of the distinguishing core No. $r+1$, however, only one output digit winding 41 is provided and is connected in series with the digit 1 output conductor 11. This is the least significant digit of the simple binary code and requires an output digit pulse for odd-numbered levels only according to Table I. Since core No. $r+1$ responds only to the combination of odd-numbered levels, it will produce the required digit 1 output pulses.

Winding 41 is shown as a reverse winding. This is on the assumption that the signal amplitude corresponding to each odd-numbered level such as $2n-5$ is less than that of the corresponding even-numbered level $2n-4$. Thus to change from level $2n-5$ to level $2n-4$ one unit has to be subtracted in the weighting network, so it is convenient to have the digit 1 pulses negative. This is not essential, so that the winding 41 could be either straight or reverse, as may be most convenient.

The rectifiers 31 to 36 are provided to eliminate the unwanted reverse output pulses which are produced by the cores when each code combination disappears. Since winding 41 is a reverse winding, the rectifier 31 is oppositely directed to the others. Alternatively, the rectifiers 31 to 36 could all be reversed, in which case the reverse output pulses would be used as the digit pulses instead of the pulses due to the initial triggering of the cores. However, if the weighting network 26 is designed so that it does not respond to the reverse pulses, the rectifiers can be omitted.

Sometimes the incoming U.D. code combinations may represent two equal series of positive and negative signal amplitude levels. In that case, the translator cores may be divided into two corresponding groups in one of which the output windings 40 are all wound straight, and in the other group the output windings 40 are all wound reverse. The positive and negative output digit pulses are then separately weighted and combined in two separate weighting networks corresponding to 26. In this case, also, there will be only a single distinguishing core $r+1$ to provide digit 1 of the simple binary code.

It should be mentioned that while a seven-digit U.D. code provides code combinations for a maximum of 70 different amplitude levels, it is clearly not essential that all of these code combinations should be used. For example, in the arrangement shown in the figure, a six-digit simple binary code provides only for 64 different levels, so that at least 6 of the U.D. code combinations would not be used. In that case, of course, there would be a maximum of 32 translator cores and one distinguishing core. However, if the 70 levels are divided into two equal groups corresponding to positive and negative levels, and if two separate weighting networks are used, then a six-digit simple binary code, using both straight and reverse output windings, as mentioned above, would provide more than the necessary number of combinations. This arrangement is, in fact, equivalent to providing a simple binary code of seven digits. To take another example, a nine-digit U.D. code provides 252 different code combinations, while an eight-digit simple binary code provides 256 different code combinations, which in the arrangement of the figure would be sufficient to cover all the U.D. code combinations. In that case 126 translator cores would be used, and the distinguishing core. However, if a seven-digit simple binary code were selected, not more than 128 of the U.D. code combinations could be used, and 64 translator cores would be supplied.

It should be pointed out that although in the case of the embodiment illustrated in the figure of the drawing it has been assumed that the input code used is a unit-disparity unit-distance code, in more general cases the code need not have the unit-disparity property. In that case each of the translator cores (or other coding elements) would deal with two code combinations of respective disparities differing by two units, and would be designed to respond to either. The distinguishing core (or other coding element) would respond to all combinations with a particular one of the two possible disparities. It will also be evident to those skilled in the art that the output code does not have to be a simple binary code, but could be any other not necessarily binary code. The cores in the figure of the drawing could evidently be provided with output windings for any desired code.

While the principles of the invention have been described above in connection with specific embodiments, and particular modifications thereof, it is to be clearly understood that this description is made only by way of example and not as a limitation on the scope of the invention.

What I claim is:

1. An electric pulse code translator for converting incoming pulse code combinations representing signal amplitude levels according to a unit-disparity unit-distance binary code into corresponding outgoing pulses according to a simple binary code, the first-mentioned code having $2m-1$ digits and providing a maximum of N different pulse code combinations, comprising $r$ similar translator cores of saturable magnetic material, where $r$ is equal to or less than $N/2$, each translator core being responsive to a different two of said incoming pulse code combinations representing two different adjacent amplitude levels to produce an output signal, an additional distinguishing core of saturable magnetic material responsive to all those incoming pulse code combinations which have disparity of one predetermined sign to produce an output signal, means for applying an incoming pulse code combination to input windings on all of the said cores in such manner as to cause an output from the particular translator core which corresponds to the incoming pulse code combination and also an output from the distinguishing core if the incoming pulse code combination has disparity of said predetermined sign, and means for deriving the corresponding outgoing pulses according to the simple binary code from output windings appropriately distributed on the corresponding core or cores.

2. A translator according to claim 1 comprising means for applying the pulses of an incoming pulse code combination simultaneously to corresponding ones of $2m-1$ digit conductors, and means for applying a magnetically saturating bias of one given sign to all the cores, the translator core corresponding to the incoming pulse code combination being provided with $2m-2$ input windings connected respectively in series with $2m-2$ of the digit conductors, the digit conductor not including an input winding being the one which corresponds to the digit which is different in the two code combinations which correspond to the particular translator core, in which $m-1$ input windings which are in series with digit conductors corresponding to digit pulses which are present in the incoming pulse code combination are so wound as to produce a magnetic field in the particular translator core of sign opposite to said given sign, the other $m-1$ windings being oppositely wound, and in which the distinguishing core is provided with $2m-1$ input windings connected respectively in series with the $2m-1$ digit conductors, each of the last-mentioned windings being so wound as to produce a magnetic field in the distinguishing core of sign opposite to said given sign, the magnetic bias of the cores being so proportioned that the pulses of the incoming pulse code combination reverse the magnetic saturation of the particular translator core only, and also that of the distinguishing core only if $m$ digit pulses are present.

3. A translator according to claim 2, in which the distinguishing core is provided with an output winding which, on reversal of the magnetic saturation of the distinguishing core, generates an output code pulse corresponding to the least significant digit of the simple binary code, and in which each of the translator cores is provided with one or more output windings which on reversal of the magnetic saturation of the translator core generate one or more output code pulses corresponding to other digits of the simple binary code.

4. A translator according to claim 2, in which for the purpose of applying the magnetically saturating bias, each core is provided with a bias winding, all the bias windings being connected in series to a direct-current bias source.

5. An electric pulse code translator for converting incoming pulse code combinations representing signal amplitude levels according to a unit-distance binary code into corresponding outgoing pulse code combinations according to a different code comprising a plurality of coding elements each responsive to a different pair of incoming pulse code combinations to produce an output signal, an additional coding element responsive to a given pulse code combination of each of said different pair of incoming pulse code combinations to produce an output signal, means for applying an input pulse code combination simultaneously to said additional coding element and each of said plurality of coding elements, and an output means coupled to said additional coding element and each of said plurality of coding elements to derive the outgoing pulse code combination from said additional coding element and a particular one of said plurality of coding elements corresponding to the applied incoming pulse code combination.

6. An electric pulse code translator according to claim 5, wherein said unit-distance binary code is also a unit-disparity binary code and said different code is a simple binary code.

7. An electric pulse code translator according to claim 5, wherein each of said plurality of coding elements and said additional coding element is a core of saturable magnetic material.

References Cited by the Examiner

UNITED STATES PATENTS

| | | | |
|---|---|---|---|
| 2,733,861 | 2/56 | Rajchman | 340—347 |
| 2,734,183 | 2/56 | Rajchman | 340—347 |
| 2,954,550 | 9/60 | Starr | 340—347 |

OTHER REFERENCES

IBM Technical Disclosure Bulletin, vol. 2, No. 2, 8/59, pages 17 and 18.

MALCOLM A. MORRISON, *Primary Examiner.*

STEPHEN W. CAPELLI, *Examiner.*